(12) United States Patent
Lee

(10) Patent No.: US 6,373,861 B1
(45) Date of Patent: Apr. 16, 2002

(54) FREQUENCY SYNCHRONIZING DEVICE FOR OFDM/CDMA SYSTEM

(75) Inventor: Hyun-Kyu Lee, Seoul (KR)

(73) Assignee: Samsung Electronics CO, Ltd. (KR)

( * ) Notice: Subject to any disclaimer, the term of this patent is extended or adjusted under 35 U.S.C. 154(b) by 0 days.

(21) Appl. No.: 09/452,359

(22) Filed: Dec. 1, 1999

(30) Foreign Application Priority Data

Dec. 1, 1998 (KR) .............................. 98-52234

(51) Int. Cl.[7] .............................. H04J 11/00; H04J 13/00
(52) U.S. Cl. .................. 370/503; 370/342; 375/354
(58) Field of Search ................... 370/208, 209, 370/335, 342, 479, 503; 375/354, 355

(56) References Cited

U.S. PATENT DOCUMENTS

| 5,608,764 A | * | 3/1997 | Sugita et al. | ............... 375/344 |
| 5,953,311 A | * | 9/1999 | Davies et al. | ............... 370/210 |
| 6,130,922 A | * | 10/2000 | Scott et al. | ............... 375/344 |
| 6,134,286 A | * | 10/2000 | Chennakeshu et al. | ..... 375/365 |
| 6,198,782 B1 | * | 3/2001 | De Courville et al. | ...... 375/341 |

* cited by examiner

Primary Examiner—Douglas Olms
Assistant Examiner—Ken Vanderpuye
(74) Attorney, Agent, or Firm—Dilworth & Barrese, LLP.

(57) ABSTRACT

A frequency synchronizing device for an OFDM/CDMA communication system which exchanges data using an OFDM frame including OFDM symbols each comprised of a plurality of data samples, and a guard interval inserted at the head of each symbol to prevent interference between the symbols. The frequency synchronizing device comprises a frequency corrector for compensating for a frequency offset of received analog data according to a frequency correction signal; an analog/digital converter for converting the received analog data to OFDM frame; and a frequency synchronizer for detecting copy data which is used for creating the guard interval from the OFDM frame and is comprised of some data samples out of the OFDM symbols, to sequentially estimate coarse, regular and fine frequency offsets, and providing the frequency corrector with the frequency correction signal corresponding to the estimated frequency offsets.

10 Claims, 4 Drawing Sheets

FREQUENCY SYNCHRONIZING DEVICE FOR OFDM/CDMA SYSTEM

BACKGROUND OF THE INVENTION

1. Field of the Invention

The present invention relates generally to a modulation/demodulation device in an orthogonal frequency division multiplexing/code division multiple access (OFDM/CDMA) system, and in particular, to a device for synchronizing a frequency in a time domain in OFDM/CDMA system.

2. Description of the Related Art

In general, an OFDM technique is frequently used in digital transmission systems such as a digital audio broadcasting (DAB) system, a digital television system, a wireless local area network (WLAN), and a wireless asynchronous transfer mode (WATM) system. The OFDM technique is a type of multi-carrier technique which modulates transmission data after dividing, and then transmits the divided modulated data in parallel. The OFDM technique was not widely used for the complex structure. However, the recent progress of various digital signal processing techniques including the fast Fourier transform (FFT) and the inverse FFT (IFFT) has made it possible to utilize the OFDM system. Though similar to the existing FDM system, the OFDM system may have an optimal transmission efficiency during high-speed data transmission by maintaining orthogonality between sub-carriers. Because of the optimal transmission efficiency, the OFDM/TDMA and OFDM/CDMA systems have been proposed for use with the WATM system since it requires high-speed data transmission.

Referring now to FIG. 1, there is shown a block diagram of a general OFDM/CDMA system. A description will now be made regarding a multi-carrier (MC) CDMA system using the OFDM/CDMA technique. The MC-CDMA system includes a transmitter 100 and a receiver 120. The transmitter 100 and the receiver 120 may be equally applied to both the forward link and the reverse link.

With regard to the transmitter 100, a plurality of spreaders 101 spread transmission data using orthogonal codes of length N and PN spreading sequences. Typically, N is 256 in the OFDM/CDMA system. If the transmitter 100 is a forward transmitter, the spreaders 101 include spreaders for user identification and spreaders for base station identification. On the other hand, if the transmitter 100 is a reverse transmitter, the spreaders 101 include spreaders for channel spreading and spreaders for user identification. Herein, the N-bit data will be referred to as chip data. The chip data spread by the spreaders 101 is input to a summer 102 after pilot signal insertion (not shown). The chip data is summed in the summer 102 on a chip unit basis and is output in series to a serial/parallel converter 103. The serial/parallel converter 103 outputs the serial chip data provided from the summer 102 in parallel. At this point, the number of the parallel chip data output can be equal to N or not equal to N. Herein, the number of the parallel chip data is assumed to be N. Further, the parallel sample data is input to an inverse fast Fourier transform (IFFT) device 104. The IFFT device 104 receiving N parallel data samples, performs OFDM modulation on the chip data. In other words, the IFFT device 104 performs IFFT on the chip data, and carries the processed chip data on different sub-carriers having orthogonality in a frequency domain. In the IFFT device 104, the sub-carriers are output in the time domain. The data output from the IFFT device 104 will be defined as sample data, and N data samples will be defined as an OFDM symbol.

The parallel output sample data is input to a parallel/serial converter 105. The parallel/serial converter 105 outputs the same data in series. Further, the parallel/serial converter 105 inserts a guard interval on an N-sample data unit basis, i.e., one-OFDM symbol unit basis. The guard interval is data obtained by copying some sample data at the rear of an OFDM symbol comprised of N data samples, and is inserted at the front of the OFDM symbol. Herein, the data in which a guard interval is inserted on an OFDM symbol unit basis, is defined as an OFDM frame. The length of the guard interval should be set longer than an impulse response length. A transmission filter 106 filters the data output from the parallel/serial converter 105 and transmits the filtered data over a radio channel 107 using an RF (Radio Frequency) module (not shown). The radio channel 107 is an additive white Gaussian channel, so that additive white Gaussian noises are added by an adder 109.

The receiver 120 receives a carrier with the additive white Gaussian noises over the additive white Gaussian channel. The received carrier is converted to a baseband signal through an RF module (not shown). A multiplier 110 compensates for frequency error generated in channel 107 using a frequency correction signal received. An analog to digital converter 115 converts the frequency-corrected analog signal input from the multiplier 110 to digital sample data stream. A serial/parallel converter 111 receives the OFDM symbol in series and outputs N data samples constituting the OFDM symbol in parallel. Though not illustrated, the receiver 120 commonly includes a guard interval remover for removing the guard interval inserted on an OFDM frame unit basis before parallelizing the sample data stream. A fast Fourier transform (FTT) device 112 performs OFDM demodulation on the received sample data carried on the sub-carriers in parallel and converts the respective sub-carriers to the original chip data in the frequency domain. A parallel/serial converter 113 converts the parallel chip data to serial chip data. A despreader 114 despreads the serial chip data input from the parallel/serial converter 113 to restore the original data.

Typically in the OFDM transmission system, if local oscillators in the transmitter and the receiver are not tuned to each other, a frequency offset occurs and causes a loss of orthogonality between the sub-carriers. In this case, even a small frequency offset may cause performance degradation of the receiving system. Therefore, in the OFDM/CDMA WATM transmission system, it is necessary to implement frequency synchronization for maintaining orthogonality between the sub-carriers.

Generally, the frequency synchronization used for a receiver of the OFDM system is performed in two steps, namely, a coarse synchronization and a fine synchronization. The coarse synchronization step removes an initial frequency offset corresponding to multiples of the sub-carrier interval, and the fine synchronization step removes the residual frequency offset remaining after coarse synchronization.

There are two coarse frequency synchronization techniques; one proposed by Classen & Myer, and another by Nogammi & Nagashima.

FIGS. 2 to 4 show a frequency synchronization device for the receiver, using the coarse frequency synchronization technique and the fine frequency synchronization technique.

First, a description will be made regarding the coarse frequency synchronization technique proposed by Classen & Myer, with reference to FIG. 2.

The technique proposed by Classen & Myer uses a test correction frequency, and calculates a correlation between known transmission data and received data while shifting the test correction frequency by a predetermined frequency interval, thereby estimating the frequency offset. This technique uses a property that the correlation value becomes maximum when the test correction frequency is nearest to an actual frequency offset shifted in the actual channel.

Referring to FIG. 2, there is shown a block diagram for detecting the test correction frequency offset. A multiplier 128 compensates for a frequency offset of a received signal using a test correction frequency received. An analog/digital converter (ADC) 129 converts the received analog data to digital data. A guard interval remover 122 removes the guard interval from the received data. A guard interval removing method sets a window having a length of two OFDM symbols and one guard interval, calculates a correlation value while shifting the window by samples, and removes the guard interval beginning at a position where the maximum value starts to be output. An FFT device 124 performs FFT to modulate the sample data output from the multiplier 128, and outputs a chip data stream in common to the despreader, a delay 125 and an estimator 127. The delay 125 delays the chip data for one-chip data length time and then outputs the delayed chip data to the estimator 127. A reference tone pattern generator 126 generates a reference tone having a predetermined pattern known to both the mobile station and the base station, and provides the generated reference tone pattern to the estimator 127.

The estimator 127 outputs an estimated frequency offset $\hat{f}_e$ by receiving the chip data output from the FFT device 124, the delayed chip data output from the delay 125 and the reference tone pattern output from the reference tone generator 126. That is, the estimator 127 outputs the estimated frequency offset $\hat{f}_e$ using a correlation value between the chip data of the two consecutive sub-channels and the reference tone known to the receiver. The estimated frequency offset $\hat{f}_e$ is a factor in determining the test correction frequency.

The estimator 127 calculates the estimated frequency offset in accordance with Equation (1) below.

$$\hat{f}_e = \text{MAX} \left| \sum_{k=1}^{L} (Z_{l+1,k} \cdot Z_{l,k}^*)(X_{l+1,k+s} \cdot X_{l,k+s}^*) \right| \quad (1)$$

where $\hat{f}_e$ denotes the estimated frequency offset, $Z_{l,k}$ and $Z_{1+l,k}$ denote the chip data of the consecutive sub-carriers, $X_{l,k}$ denotes the data stream previously known to the receiver during data reception, 's' denotes the frequency shift for sync estimation, 'l' denotes an index of the sample data, and 'k' denotes an index of the OFDM symbol. It is noted from Equation (1) that the two consecutive chip data exist in the same OFDM symbol.

Referring to FIG. 3, a description will now be made regarding the coarse frequency synchronization technique proposed by Nogammi & Nagashima. An analog to digital converter (ADC) 131 converts analog data received from a multiplier 140 to digital sample data. A guard interval remover 133 removes from the received data a guard interval which is used for distinguishing the received sample data and for preventing interference between the symbols. An FFT device 135 performs a FFT on the sample data output from the ADC 131, and outputs a chip data stream to both a despreader and a correlator 139. A reference tone pattern generator 137 generates a predetermined reference tone pattern and provides correlator 139 with the reference tone pattern. The correlator 139 outputs an estimated frequency offset $\hat{f}_e$ using the chip data output from the FFT device 135 and the reference tone pattern output from the reference tone pattern generator 137.

The coarse frequency synchronization technique proposed by Nogammi & Nagashima is different from the technique proposed by Classen & Myer in that a correlation value between one data sample and a reference tone known to the receiver is used for frequency synchronization instead of a correlation value between two consecutive data samples and the reference tone.

The estimated frequency offset according to the technique proposed by Nogammi & Nagashima is calculated by Equation (2) below.

$$\hat{f}_e = \text{MAX} \left| \sum_{k=1}^{L} (Z_{l+1} \cdot X_{l,k+s}^*) \right| \quad (2)$$

In addition to the coarse frequency synchronization techniques, there are two fine frequency synchronization techniques; one proposed by Dafara & Adami, and another by Moose.

The technique proposed by Dafara & Adami acquires fine frequency synchronization using a property of the transmission signal, namely that when there exists no frequency offset, a signal in the guard interval of the received signal is identical to the original signal. In addition, when there exists a frequency offset, a signal in the guard interval and the original signal have different phases due to the frequency offset, and finally, when the signal in the guard interval is multiplied by the original signal, an imaginary part of the resulting value contains information about the frequency offset. The present invention removes the residual frequency offset according to this property.

Referring to FIG. 4, a description will now be made regarding the fine frequency synchronization technique. A bandpass filter 141 filters analog data and only permits a frequency band that is proper for the system to pass. A multiplier 143 multiplies the filtered received data by the test correction frequency in order to correct a fine frequency offset. An ADC 145 converts the frequency offset-corrected analog data output from multiplier 143 to digital OFDM frame data. A guard interval remover 153 removes the guard interval included in the OFDM frame from the OFDM frame output from the ADC 145, and outputs OFDM symbols. An FFT device 155 parallelizes the OFDM symbols output from the guard interval remover 153 into N data samples, and performs FFT on the N data samples to output N-chip data. In order to simplify the drawing, FFT 155 contains a serial/parallel data converter and a parallel/serial converter similar to elements 111, 112, and 113 of FIG. 1. The data output of FFT 155 is in the for of serial data.

A frequency detector 147 detects a frequency error for compensating for the fine frequency offset. The frequency detector 147 can detect the frequency error through either a path 'a' or a path 'b'.

The frequency error detection through the path 'a' uses the guard interval. More specifically, the frequency detector 147 detects the guard interval from the OFDM frame output from the ADC 145. The detected guard interval is compared with a sample data interval in order to detect the frequency error. The sample data of N sample data of the OFDM symbol used to generate the guard interval out of pure sample data. Specifically, some sample data of N same data are copied and inserted in the beginning of the OFDM symbol.

Frequency error detection through the path 'b' uses the fast Fourier transformed-chip data from FFT 155. For frequency error detection through the path 'b', a carrier extractor 157 is required. The carrier extractor 157 extracts pilot chip data that is inserted in the chip data stream output from the FFT 155 and provides the frequency detector 147 with the extracted pilot chip data. The frequency detector 147 then detects the frequency error by comparing the pilot chip data with a known signal.

The technique proposed by Dafara & Adami uses the 'a' path wherein the frequency detector 147 uses the guard interval from the digital data output from the ADC 145 and outputs an estimated fine frequency offset calculated by $$\hat{f}_e = \frac{1}{L} \tan^{-1} \sum_{k=1}^{L} \text{Im} Z_{l,N-1} \cdot Z_{l,-1}^* \quad (3)$$

where N denotes the sample number of OFDM symbol, and I denotes the sample number in the guard interval. In addition, m denotes calculating only th imaginary number value of the complex number value and "*" refers to the conjugate of a complex number.

The technique proposed by Moose uses the 'b' path wherein the frequency detector 147 receives the pilot signal from the FFT device 155 through the carrier extractor 157 and outputs an estimated fine frequency offset calculated by $$\hat{f}_e = \frac{1}{2\pi r} \tan^{-1} \left\{ \frac{\sum_{k=1}^{L} (Z_{l+1,k} \cdot Z_{l,k}^*)}{\sum_{k=1}^{L} (Z_{l+1,k} \cdot Z_{l,k}^*)} \right\} \quad (4)$$

where L denotes the sample number used when estimating the frequency error and r refers to the guard interval.

The estimated fine frequency offset detected by the frequency detector 147 through path 'a' or 'b' is input to a voltage controlled oscillator (VCO) 151 through a lowpass filter 149. The voltage controlled oscillator 151 generates the test correction frequency depending upon the estimated fine frequency offset and provides the generated test correction frequency to the multiplier 143.

The guard interval based (GIB) fine frequency synchronizing technique through the path 'a' is implemented at a pre-FFT stage, and the pilot signal based fine frequency synchronizing technique (or maximum likelihood estimation (MLE)) through the path 'b' is implemented at a post-FFT stage.

If a test correction frequency offset is $\hat{f}_e$, then the received baseband signal can be expressed as $x(t)e^{j2\pi \hat{f}_e t}$. At this point, in the GIB algorithm, the phase difference between two samples is constantly $2\pi \hat{f}_c t$. However, in the MLE algorithm, the phase difference between two samples is $2\pi \hat{f}_c t'$ which is affected by the length of the guard interval.

As described above, the conventional coarse frequency synchronization technique is susceptible to channel noises, therefore, it is difficult to guarantee the system performance.

Further, the fine frequency synchronization is locked at a sub-carrier which is located nearest to a position of the residual frequency offset. However, when the residual frequency offset has a value of about ±0.5% of the sub-carrier interval, the conventional fine frequency synchronization technique cannot acquire synchronization.

Moreover, the MLE algorithm processes the data at the post-FFT stage, thereby causing a delay in acquiring synchronization. This delay will increase the time required for synchronization acquisition.

SUMMARY OF THE INVENTION

It is therefore, an object of the present invention to provide a frequency synchronizing device for performing frequency synchronization using only the guard interval signal in a time domain in an OFDM/CDMA system.

It is another object of the present invention to provide a frequency synchronizing device for acquiring accurate synchronization by performing frequency synchronization in the steps of coarse, regular and fine frequency synchronization in a time domain in an OFDM/CDMA system.

To achieve the above objects, there is provided a frequency synchronizing device for an OFDM/CDMA communication system which exchanges data using an OFDM frame including OFDM symbols each comprised of a plurality of data samples, and a guard interval inserted at the head of each symbol to prevent interference between the symbols. The frequency synchronizing device comprises a frequency corrector for compensating for a frequency offset of the received analog data according to a frequency correction signal; an analog/digital converter for converting the received analog data to an OFDM frame; and a frequency synchronizer for detecting copy data which is used for creating the guard interval from the OFDM frame. The copy data is comprised of some data samples out of the OFDM symbols and is used to sequentially estimate coarse, regular and fine frequency offsets, and provide the frequency corrector with the frequency correction signal corresponding to the estimated frequency offsets. The copy data is equal to the guard interval within an OFDM frame.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 5:
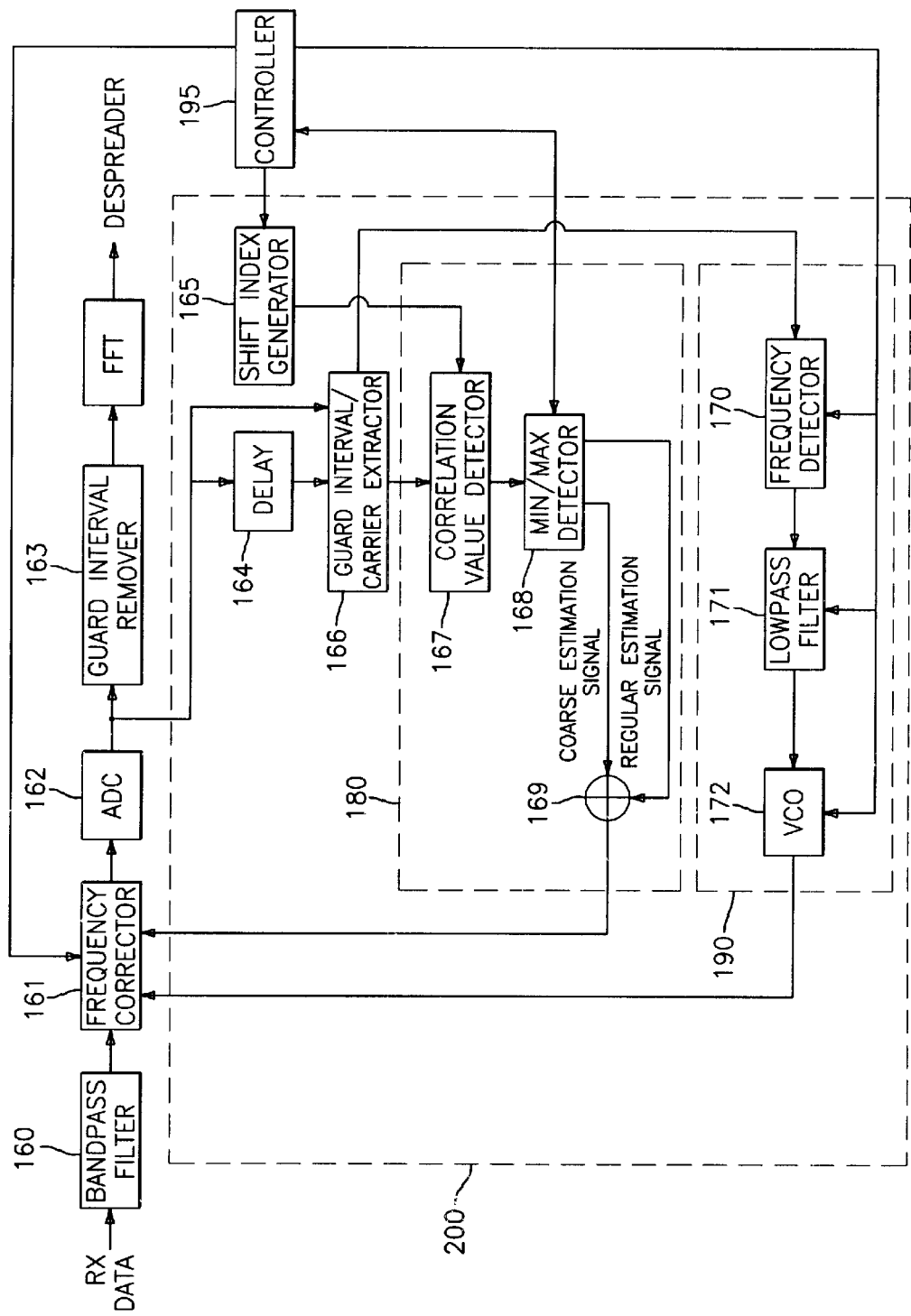
FIG. 5 is a block diagram illustrating a frequency synchronizing device for a receiver in an OFDM/CDMA system according to an embodiment of the present invention.

Referring to FIG. 5, there is shown a frequency synchronizing device for an OFDM/CDMA system according to an embodiment of the present invention. A bandpass filter 160 filters received analog data. A frequency corrector 161 compensates for a frequency offset of the bandpass filtered data according to a first and a second frequency correction signal and a control signal. An ADC 162 converts the received frequency offset-compensated analog data to digital sample data, and provides the digital sample data to a guard interval remover 163. The guard interval remover 163 removes a guard interval which is inserted on a OFDM frame unit basis, from the sample data. A frequency synchronizer 200 calculates an estimated frequency offset for coarse, regular and fine frequency synchronizing depending on a signal output from the ADC 162, and outputs the first and second frequency correction signals according to the estimated frequency offsets.

Now, Reference will be made describing a coarse, regular and fine frequency synchronizing method, respectively.

With regard to the coarse frequency synchronizing method, a controller 195 controls the overall operation of the frequency synchronizing device. In particular, the controller 195 outputs a coarse delay signal for performing initial coarse frequency synchronization, outputs a regular delay signal after acquiring coarse frequency synchronization, and outputs a fine delay signal after acquiring regular frequency synchronization. A delay 164 delays an OFDM frame output from the ADC 162 for a predetermined time. The delay time is identical to one-OFDM frame time. A guard interval/carrier extractor 166 receives the OFDM frame output from the ADC 162 and the OFDM frame output from the delay 164, and extracts therefrom copy data to create the above guard interval and a guard interval in the original OFDM symbol. A shift index generator 165 outputs a shift index of an integer according to the coarse delay signal output from the controller 195, and upon receipt of the regular delay signal, outputs a shift index having an increasing value from 0 to 1 in 0.1 ($\frac{1}{10}$) steps. The increasing shift index shifts the guard interval by the same amount until regular frequency sync is performed. A coarse frequency synchronizer 180 is comprised of the following: a correlation value detector 167, a minimum/maximum value (MIN/MAX) detector 168, and an adder 169. Correlation value detector 167 receives the guard interval and the copy data from the interval/carrier extractor 166 and the shift index value from the shift index generator 165, and extracts a correlation value while shifting the guard interval and the copy data on a sample data unit basis. The sample data unit basis being an OFDM symbol. The extracted correlation value is provided to a minimum/maximum value (MIN/MAX) detector 168. The MIN/MAX detector 168 detects the maximum or minimum value of the correlation value input from the correlation value detector 166 according to the delay signal output from the controller 195. For coarse frequency synchronization, the MIN/MAX detector 168 detects the minimum value according to the coarse delay signal input from the controller 195. The minimum value detected at this point is a coarse estimation signal. Further, upon detection of the minimum value, the MIN/MAX detector 168 informs the controller 195 of detection of the minimum value.

When there exists a frequency offset, the received signal is shifted overall, so that noises are inserted in the guard interval. By using this property, the coarse frequency offset is estimated in the guard interval/carrier extractor 166, the correlation value detector 167 and the MIN/MAX detector 168. The estimated frequency offset for coarse frequency synchronization by detecting guard interval power in the time domain is calculated by $$\hat{f}_e = \text{MIN}\left\{\sum_{k=K_{MIM}-i}^{K_{MIN}+1}|Z_{l,k+s}|^2 + \sum_{K_{MAX}+1}^{K_{MAX}+i}|Z_{l,k+s}|^2\right\} \quad (5)$$

where i denotes the size of a sliding window (index varying in the guard interval), $K_{MIN}$ and $K_{MAX}$ denote the minimum and maximum sub-carrier numbers of FFT, respectively, and $Z_1$ denotes a symbol.

Second, with regard to the regular frequency synchronizing method, the guard interval/carrier extractor 166 extracts the guard interval and copy data from an OFDM frame output from the ADC 162. The correlation value detector 167 receives the guard interval and copy data from the guard interval/carrier extractor 166 and a shift index having an increasing value from 0 to 1 in 0.1 steps. The shift index is equal to $\frac{1}{10}$ the length of the sample data from the shift index generator 165. The correlation value detector 167 then detects a correlation value while shifting the sample data in the detected guard interval and sample data of the copy data, which is identical to the above sample data. The MIN/MAX detector 168 detects a correlation value having the maximum power out of the correlation values detected by the correlation value detector 167, and outputs a regular estimated frequency offset which is a regular estimation signal. The estimated frequency offset for regular frequency synchronization is calculated by $$\hat{f}_e = \text{MAX}\left\{\sum_{k=f_{trial}}^{1}(Z_{l+1,k} \cdot Z_{l,k}^*)(X_{l+1,k+s}^* \cdot Z_{l,k+s})\right\} \quad (6)$$

where $f_{trial}$ denotes a compulsory test correction frequency and has a value larger than '0' but smaller than '1'. Once the compulsory test correction frequency interval is selected, the regular frequency offset is determined while increasing it at the unit interval. In Equation (6), Z denotes sample data in the guard interval, and X denotes the copy data.

After estimation of the coarse frequency offset and the regular frequency offset, the MIN/MAX detector 168 outputs the coarse estimation signal and a regular estimation signal. An adder 169 adds the coarse estimation signal to the regular estimation signal to generate the first frequency correction signal, and provides the first frequency correction signal to the frequency corrector 161.

Figure 1:
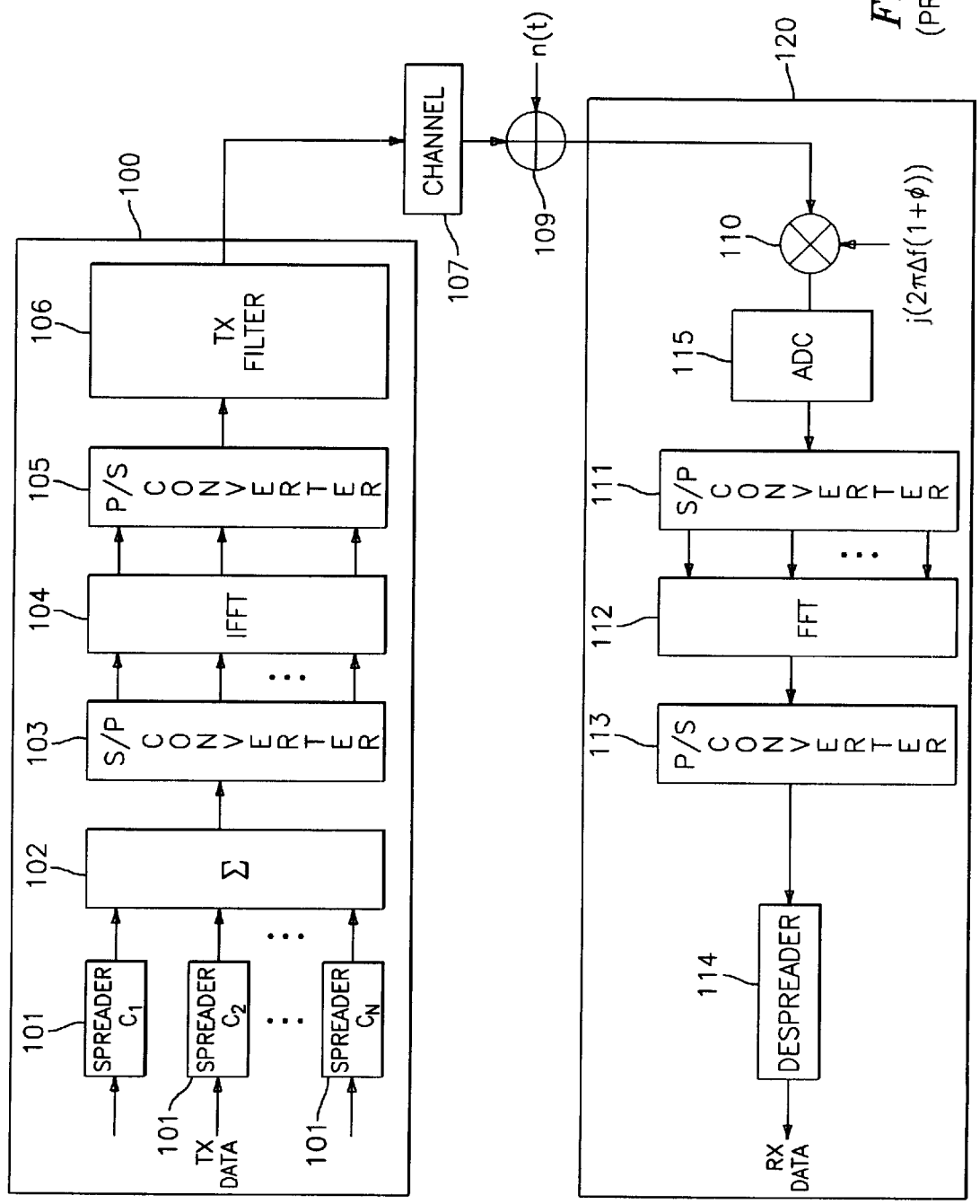
FIG. 1 is a block diagram illustrating a general OFDM/CDMA system.
Figure 2:
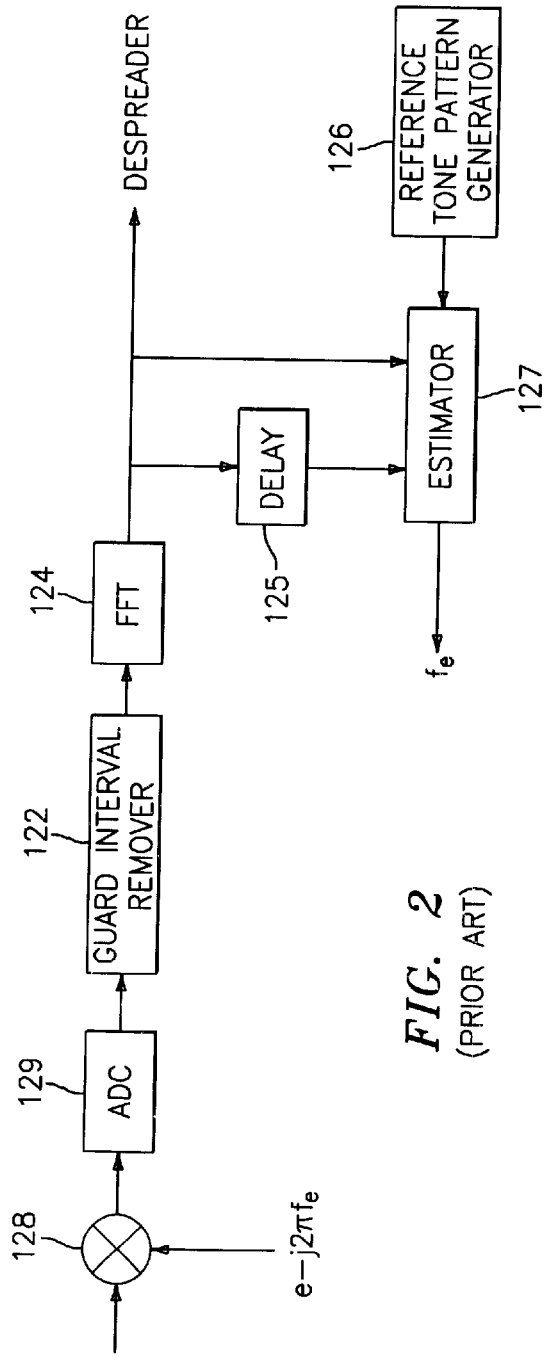
FIG. 2 is a block diagram illustrating a coarse frequency synchronizing device in the general OFDM/CDMA system.
Figure 3:
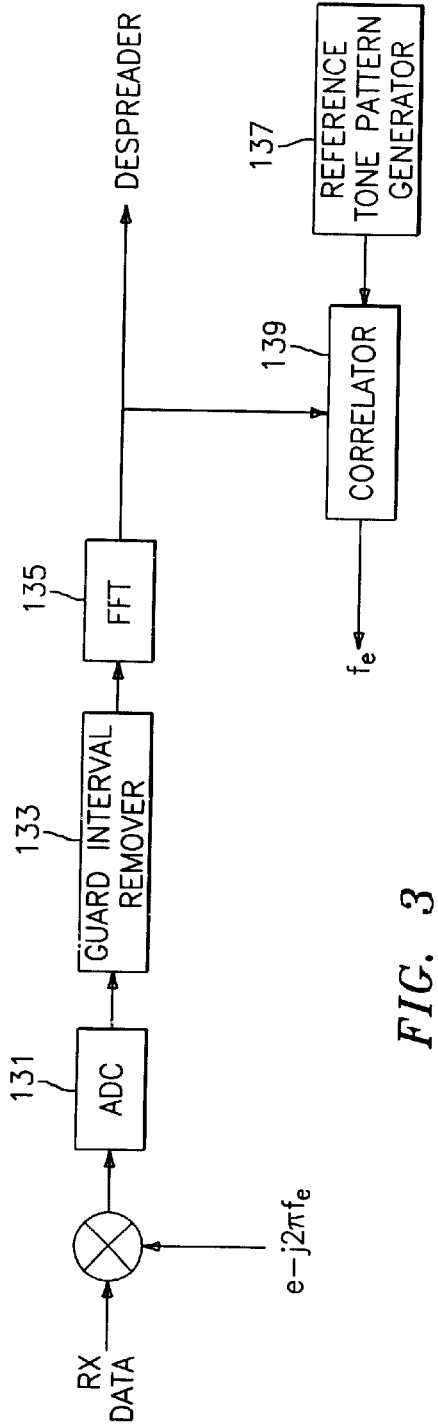
FIG. 3 is a block diagram illustrating another coarse frequency synchronizing device in the general OFDM/CDMA system.
Figure 4:
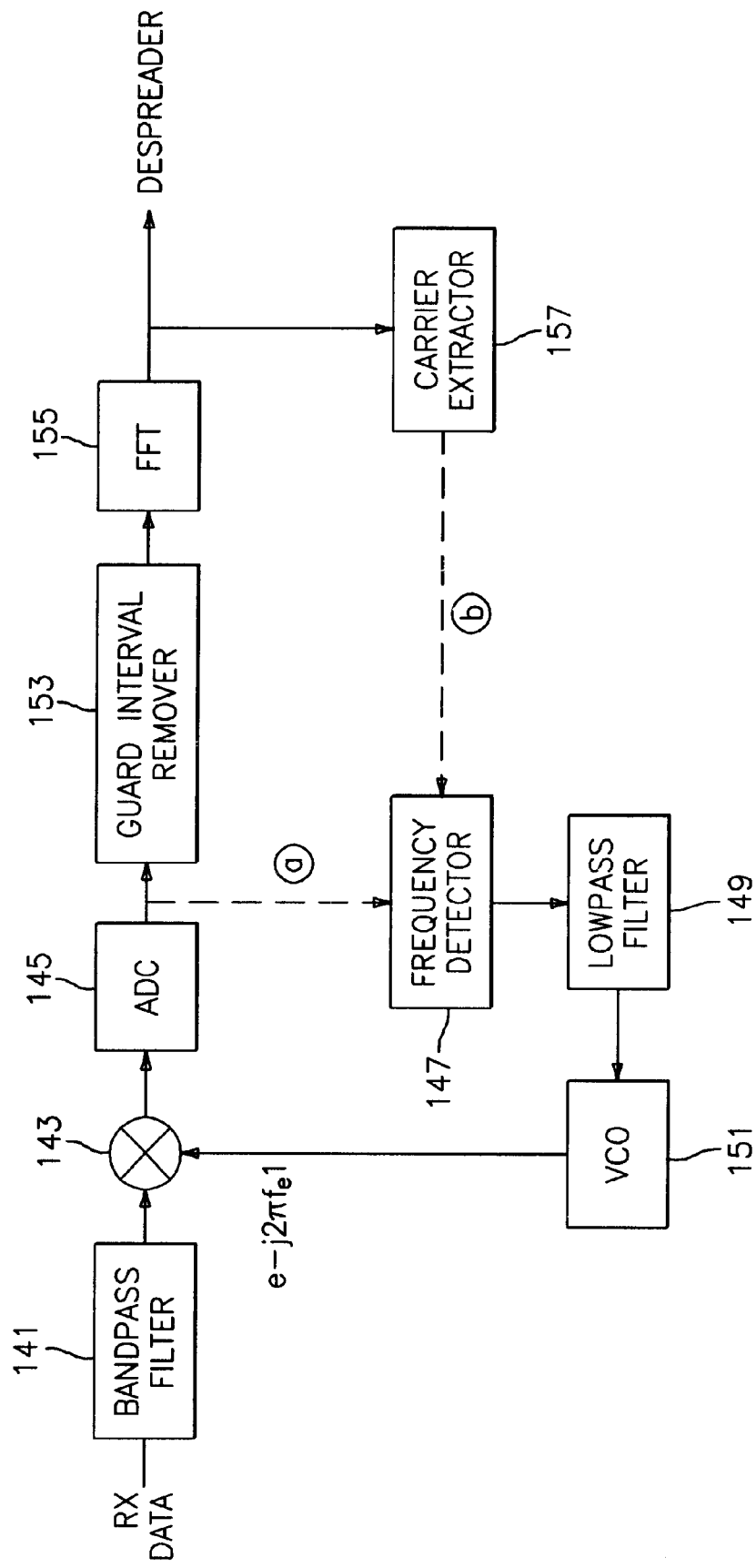
FIG. 4 is a block diagram illustrating a fine frequency synchronizing device in the general OFDM/CDMA system.

With regard to the fine frequency synchronizing method, the guard interval/carrier extractor 166 extracts the guard interval and copy data from an OFDM frame output from the ADC 162, and provides the extracted guard interval and copy data to a frequency detector 170. The fine frequency synchronization is accomplished using a fine frequency synchronizer 190 and is performed after acquiring the coarse and regular frequency synchronization. Fine frequency synchronizer 190 is comprised of frequency detector 170, a lowpass filter 171 and a voltage controlled oscillator (VCO). The GIB frequency synchronization technique described with reference to FIG. 4 is used for the fine frequency synchronization. That is, frequency detector 170, under the control of controller 195, receives the sample data in the guard interval output from the guard interval/carrier extractor 166 and sample data of the copy data, which is identical to the above sample data of the FFT input terminal, to detect a phase difference between the two sample data, and determines the detected phase difference as a fine frequency offset. The frequency detector 170 provides the fine frequency offset to a voltage controlled oscillator (VCO) 172 via a lowpass filter 171. The voltage controlled oscillator 172 and the lowpass filter 171 are controlled by the controller 195. The voltage controlled oscillator 172 generates the second frequency correction signal depending on the fine frequency offset and provides the generated second frequency correction signal to the frequency corrector 161. The fine frequency offset is calculated by $$\hat{f}_e = \frac{1}{2\pi r} \tan^{-1} \left\{ \frac{\sum_{k=1}^{L} (Z_{l+1,k} \cdot Z_{l,k}^*)}{\sum_{k=1}^{L} (Z_{l+1,k} \cdot Z_{l,k}^*)} \right\} \quad (7)$$

The frequency corrector 161 then corrects a frequency offset of the received signal according to the first frequency control signal output from the adder 169 and the second frequency correction signal output from the voltage controlled oscillator 172, under the control of the controller 195.

The frequency synchronizing device according to the present invention is unaffected by the noises generated during OFDM transmission and can acquire frequency synchronization at about ½ position of the sub-carrier interval in the frequency domain by performing three steps of coarse, regular and fine frequency synchronization. This secures accurate synchronization and increases the performance of the receiver.

While the present invention has been shown and described with reference to a certain preferred embodiment thereof, it will be understood by those skilled in the art that various changes in form and details may be made thereunto without departing from the spirit and scope of the invention as defined by the appended claims.

What is claimed is:

1. A frequency synchronizing device for an OFDM/CDMA (Orthogonal Frequency Division Multiplexing/Code Division Multiple Access) communication system which exchanges data using an OFDM frame including OFDM symbols each comprised of a plurality of data samples, and a guard interval inserted at the head of each symbol to prevent interference between the symbols, the frequency synchronizing device comprising:
   a frequency corrector for compensating for a frequency offset of received analog data according to a frequency correction signal;
   an analog/digital converter for converting the received analog data to the OFDM frame; and
   a frequency synchronizer for sequentially estimating a coarse, a regular and a fine frequency offset, and for providing said frequency corrector with said frequency correction signal corresponding to said estimated coarse, regular and fine frequency offsets.

2. The frequency synchronizing device according to claim 1, further comprising a controller for generating a control signal for sequentially performing coarse, regular and fine frequency synchronization.

3. The frequency synchronizing device according to claim 2, wherein said frequency synchronizer comprises:
   a guard interval/carrier extractor for extracting the guard interval and copy data from the OFDM frame;
   a shift index generator for generating a shift index according to the control signal;
   a coarse frequency synchronizer for receiving first sample data in the guard interval and second sample data of copy data, and detecting a correlation value between the first and second sample data while shifting the first and second sample data according to the shift index, to output a first frequency correction signal to the frequency corrector; and
   a fine frequency synchronizer for performing a phase-locked loop on the first and second sample data provided after coarse frequency synchronization, to output a second frequency correction signal to the frequency corrector.

4. The frequency synchronizing device as claimed in claim 3, wherein said coarse frequency synchronizer comprises:
   a correlation value detector for detecting a correlation value while shifting the first and second sample data according to the shift index;
   a maximum/minimum value detector for detecting a minimum value out of the correlation values to output a coarse estimation signal when the control signal is a coarse control signal, and detecting a maximum value out of the correlation values to output a regular estimation signal when the control signal is a regular control signal; and
   an adder for adding the coarse estimation signal to the regular estimation signal to output the first frequency correction signal to the frequency corrector.

5. The frequency synchronizing device as claimed in claim 4, wherein the coarse estimation signal is calculated by $$\hat{f}_e = \text{MIN} \left\{ \sum_{k=K_{MIM}-i}^{K_{MIN}+1} |Z_{l,k+s}|^2 + \sum_{K_{MAX}+1}^{K_{MAX}+i} |Z_{l,k+s}|^2 \right\}.$$

6. The frequency synchronizing device as claimed in claim 4, wherein the regular estimation signal is calculated by $$\hat{f}_e = \text{MAX} \left\{ \sum_{k=f_{trial}}^{1} (Z_{l+1,k} \cdot Z_{l,k}^*)(X_{l+1,k+s}^* \cdot X_{l,k+s}) \right\}.$$

7. The frequency synchronizing device as claimed in claim 3, wherein the fine frequency synchronizer further comprises:
   a frequency detector for detecting a pilot signal of a carrier output from the guard interval/carrier extractor;
   a lowpass filter for filtering the pilot signal detected by the frequency detector; and
   a voltage controlled oscillator for outputting a second frequency correction signal depending on the pilot signal output from the lowpass filter, to correct the fine frequency offset.

8. The frequency synchronizing device as claimed in claim 7, wherein the second frequency correction signal is a fine estimation offset signal.

9. The frequency synchronizing device as claimed in claim 8, wherein the fine estimation offset signal is calculated by $$\hat{f}_e = \frac{1}{2\pi r} \tan^{-1} \left\{ \frac{\sum_{k=1}^{L} (Z_{l+1,k} \cdot Z_{l,k}^*)}{\sum_{k=1}^{L} (Z_{l+1,k} \cdot Z_{l,k}^*)} \right\}.$$

10. The frequency synchronizing device according to claim 3, wherein said shift index generator generates a shift index ranging between 0 and 1 in 0.1 (1/10) steps.

* * * * *